United States Patent [19]
Naugler et al.

[11] Patent Number: 5,709,724
[45] Date of Patent: Jan. 20, 1998

[54] PROCESS FOR FABRICATING A HERMETIC GLASS-TO-METAL SEAL

[75] Inventors: Robert E. Naugler, Arvada; Frank E. Anderson, Golden, both of Colo.

[73] Assignee: Coors Ceramics Company, Golden, Colo.

[21] Appl. No.: 286,015

[22] Filed: Aug. 4, 1994

[51] Int. Cl.$^6$ ................................................. C03C 27/02
[52] U.S. Cl. ........................ 65/59.4; 65/59.6; 65/59.7
[58] Field of Search .......................... 65/59.7, 59.4, 65/59.6

[56] References Cited

U.S. PATENT DOCUMENTS

| | | | |
|---|---|---|---|
| 2,696,191 | 12/1954 | Sheehan | 102/86.5 |
| 3,082,691 | 3/1963 | Evans et al. | 102/28 |
| 3,134,329 | 5/1964 | Zeman | 102/28 |
| 3,223,599 | 12/1965 | Taylor | 204/15 |
| 3,291,046 | 12/1966 | Dahl | 102/28 |
| 3,308,758 | 3/1967 | Stadler et al. | 102/28 |
| 3,426,682 | 2/1969 | Corren et al. | 102/28 |
| 3,429,260 | 2/1969 | Corren | 102/28 |
| 3,600,017 | 8/1971 | Scherer | 287/189.365 |
| 3,695,179 | 10/1972 | Ralnone et al. | 102/70.2 R |
| 3,847,628 | 11/1974 | Modebadze | 106/52 |
| 3,858,392 | 1/1975 | Evans et al. | 60/637 |
| 3,971,320 | 7/1976 | Lee | 102/28 R |
| 3,983,624 | 10/1976 | Gross | 29/628 |
| 4,103,619 | 8/1978 | Fletcher et al. | 102/28 R |
| 4,249,673 | 2/1981 | Katoh et al. | 222/3 |
| 4,267,567 | 5/1981 | Nygaard et al. | 362/46 |
| 4,411,680 | 10/1983 | Kyle | 65/33 |
| 4,441,427 | 4/1984 | Barrett | 102/202.6 |
| 4,445,920 | 5/1984 | Smith | 65/59.21 |
| 4,484,523 | 11/1984 | Smith et al. | 102/202.5 |
| 4,509,880 | 4/1985 | Wamstad | 403/179 |
| 4,706,382 | 11/1987 | Suppinger et al. | 29/879 |
| 4,716,082 | 12/1987 | Ahearn et al. | 428/428 |
| 4,743,302 | 5/1988 | Dumesnil et al. | 106/1.23 |
| 4,788,382 | 11/1988 | Ahearn et al. | 174/52 FP |
| 4,810,849 | 3/1989 | Heideman | 219/89 |
| 5,026,963 | 6/1991 | Saito et al. | 219/89 |
| 5,076,607 | 12/1991 | Woods et al. | 280/737 |
| 5,113,764 | 5/1992 | Mandigo et al. | 102/202.9 |
| 5,131,679 | 7/1992 | Novak et al. | 280/736 |
| 5,140,906 | 8/1992 | Little, II | 102/202.1 |
| 5,145,803 | 9/1992 | Daimer et al. | 501/15 |
| 5,157,831 | 10/1992 | Wang et al. | 29/876 |
| 5,188,990 | 2/1993 | Dumesnil et al. | 501/19 |
| 5,200,574 | 4/1993 | Cunningham et al. | 102/830 |
| 5,243,492 | 9/1993 | Marquit et al. | 361/247 |
| 5,404,263 | 4/1995 | Graves et al. | 361/247 |

OTHER PUBLICATIONS

Engineering drawing entitled "Initiator Subassembly," dated Feb. 6, 1990.
Engineering drawing entitled "Header, Glass Sealed Assembly," dated Dec. 8, 1976 by the Dept. of Navy, naval Sea Systems Command.
Engineering drawing entitled "Header Assy," dated Apr. 17, 1989.

*Primary Examiner*—Timothy Speer
*Attorney, Agent, or Firm*—Townsend and Townsend and Crew LLP

[57] ABSTRACT

A process for forming a hermetic glass-to-metal seal between a conductive pin and an outer body, wherein a corrosion-resistant noble metal (e.g., gold) coating is applied to the conductive pin before the hermetic seal is formed. The process generally includes providing a noble metal-coated conductive pin, placing glass having a softening point less than about 650° C. into a cavity of the outer body, inserting the coated conductive pin into a bore in the glass preform, heating the assembly to a temperature in excess of the softening point of the glass but less than about 700° C., and cooling the assembly. The coefficients of thermal expansion of the components of the assembly are preferably selected such that the resulting assembly is a hermetic compression seal.

26 Claims, 2 Drawing Sheets

PROCESS FOR FABRICATING A HERMETIC GLASS-TO-METAL SEAL

FIELD OF THE INVENTION

The present invention generally relates to glass-to-metal seals for electronic devices and, more particularly, to hermetic glass-to-metal seals for electronic devices that have a noble metal coated on an electrode of the device.

BACKGROUND OF THE INVENTION

Hermetic sealing of electronic devices is important in many areas of the electronics industry to insure an airtight environment for the various components of the device. Many devices (e.g., automotive airbag inflators) require high reliability for long periods of time and are typically hermetically sealed within a hollow, outer body. Electrical interconnection between the sealed electronic device and external circuitry is provided by conductive pins passed through apertures in the outer body. To provide a hermetic and insulative seal between the conductive pins and the outer body, the gap therebetween can be filled with glass to form a glass-to-metal seal.

There are two types of glass-to-metal seals. When hermeticity is predominately achieved by molecular bonding between the glass and metal components, it is referred to as a matched seal. To obtain molecular bonding, the surfaces of the metal components (e.g., the conductive pin and the outer body) are typically oxidized to provide a surface to which the glass can readily bond. Glass is disposed into the gap between the oxidized outer body and the oxidized conductive pin. For example, a glass preform may be inserted into the outer body and the pin may be inserted into a bore in the glass preform. Subsequent heating of the assembly above the softening point of the glass results in the glass flowing over the oxide coating of the metal components. As the assembly is cooled, a molecular bond is formed between the oxide surfaces and the glass. To avoid residual thermal stresses between the various components, the components typically have substantially matching coefficients of thermal expansion (CTEs).

Compression seals, on the other hand, achieve hermeticity by the interaction of residual stresses created between the various components due to differing CTEs. That is, the outer body typically has a CTE which is greater than the CTE for the glass preform. In addition, the glass preform may have a CTE greater than that for the conductive pin. To form the seal, the assembled components are heated to a temperature above the softening point of the glass preform, typically about 950° C. or higher, so that the glass flows to fill the void between the conductive pin and the outer body. Upon cooling, the outer body contracts at a faster rate than the glass, thereby applying compressive forces on the glass and the conductive pin. These compressive forces provide the seal between the various components. An example of a compression seal is disclosed in U.S. Pat. No. 5,243,492, by Marquit et al., which is incorporated herein by reference in its entirety.

The conductive pins used in these applications are typically fabricated from iron-nickel alloys. In many applications, it is desirable to provide the exterior surface of the conductive pin with a corrosion-resistant coating, such as a noble metal (e.g., gold, silver, platinum, palladium, etc.). The most commonly used of the noble metal coatings is gold. In order to provide proper adhesion of a gold coating to the underlying metal, an intermediate coating of another metal, such as nickel, is typically provided. However, gold tends to substantially diffuse into nickel at temperatures of about 700° C. and higher, thereby degrading the corrosion resistance of the coating. In addition, gold coating of the entire surface of the conductive pins prior to heating the assembly to form a matched seal is not practical because an oxidized coating cannot easily be adhered to a gold coating.

U.S. Pat. No. 4,706,382 by Suppinger et al. discloses that, in matched seals, plating conductive pins with gold prior to their assembly in a header is not a practical alternative due to the necessity of a preoxidized, plating-free metal surface to achieve an effective glass-to-metal seal. Plating prior to assembly is also not practical in the process disclosed by Suppinger et al. due to the sealing temperature of the glass utilized, i.e., about 950° C. to 1,000° C.

U.S. Pat. Nos. 4,788,382 to Ahearn et al. and U.S. Pat. No. 5,157,831 to Wang et al. both disclose that conductive pins can be plated with a layer of gold to improve corrosion resistance. Although it is unclear from the disclosure of these patents when the gold is plated onto the pins, the plating is believed to occur after formation of the hermetic seal because of the sealing temperatures utilized in these patents. For example, Ahearn et al. disclose the use of Corning 9010 or 9013 glasses, available from the Corning Corporation, which have sealing temperatures of about 1000° C. Wang et al. disclose heating the glass to a temperature of between 750° C. and 1500° C. and also disclose that the metallic shell and metallic pin are heated in an oxidized atmosphere to form an oxide layer.

When a gold plated pin is desired, the gold is typically plated onto the conductive pin after assembly and formation of the hermetic seal by masking and/or selectively plating the conductive pins so that the gold does not plate onto the other metallic components of the electronic device. The masking and selective plating process is time-consuming and labor-intensive and therefore adds significantly to the overall cost of the device. In addition, the masking process is sometimes imprecise, resulting in gold inadvertently plating onto other areas and causing an electrical short or resulting in incomplete coverage of the entire exposed surface of the conductive pin leaving areas prone to corrosion.

Accordingly, there is a need for a relatively inexpensive and efficient process for forming a glass-to-metal seal with a coated conductive pin. It would be advantageous if such a process avoided the use of expensive and time-consuming masking and/or selective plating steps and avoided the possibility of coating the outer body and producing an electrical short. It would also be advantageous if the conductive pin could be reliably coated with a noble metal coating over substantially the entire exposed surface of the pin to reduce the likelihood of failure of the device due to corrosion at exposed, uncoated areas of the pin.

SUMMARY OF THE INVENTION

According to one aspect of the present invention, a process for forming a glass-to-metal seal between a conductive pin, a glass, and an outer body is provided wherein the conductive pin is coated with a layer of a noble metal prior to heating the components to form the seal. The process generally includes the steps of providing a conductive pin having a layer of noble metal, such as gold or platinum, coated on at least a portion of its outer surface, placing glass having a softening point of less than about 650° C. within the cavity of an outer body, inserting the coated pin into the glass, heating the components to a temperature of at least equal to the softening point of the glass and less than about 700° C., and cooling the components to solidify the glass and form a glass-to-metal seal. By using a glass having a softening point of less than about 650° C., the heating step can be performed at a temperature below the temperature at which the noble metal will substantially diffuse into the underlying pin, thereby allowing the conductive pin to be plated before the heating step by, for example, a low-cost barrel plating process. The ability to plate before the heating step also allows the conductive pin to be coated on substantially all of the outer surface thereof to decrease product failures caused by incomplete corrosion resistant plating.

In one embodiment of this aspect of the invention, the outer body has a CTE that is greater than the CTE of the glass, thereby forming a compression seal. The CTE of the outer body is preferably at least about $10\times10^{-7}$ per °C. greater than the CTE of the glass. For example, the outer body can have a CTE of from about $120\times10^{-7}$ per °C. to about $200\times10^{-7}$ per °C., and the glass preform can have a CTE of from about $80\times10^{-7}$ per °C. to about $110\times10^{-7}$ per °C. In another embodiment, in order to avoid residual stresses between the glass and the conductive pin, the glass has a CTE that is substantially similar to the CTE of the conductive pin. For example, the difference between the CTE of the conductive pin and the glass is preferably less than about $25\times10^{-7}$ per °C. For example, the glass may have a CTE of from about $80\times10^{-7}$ per °C. to about $110\times10^{-7}$ per °C., and the conductive pin may have a CTE of from about $90\times10^{-7}$ per °C. to about $115\times10^{-7}$ per °C.

According to one embodiment of this aspect of the present invention, the outer body is a metal, preferably stainless steel. In another embodiment, the conductive pin has a layer of noble metal coated over substantially all of its outer surface. In yet another embodiment, the conductive pin is fabricated from an iron-nickel alloy. In order to improve the bonding of the noble metal layer to the conductive pin, a sublayer, for example nickel having a thickness of from about 25 microinches to about 200 microinches, may be provided under the noble metal layer. The noble metal layer preferably has a thickness of from about 50 microinches to about 300 microinches, more preferably of from about 80 microinches to about 150 microinches. The conductive pin can advantageously be coated (i.e., both the sublayer and the noble metal layer) using a barrel plating process such that large quantities of pins can be plated in a convenient and inexpensive manner.

The glass can advantageously be in the form of a glass preform, such as a drawn tube or a pressed-powder preform, having a bore therethrough for insertably receiving the coated pin. The heating step includes heating to a temperature of less than the temperature at which substantial diffusion of the noble metal into the conductive pin will occur. Preferably, the heating step includes heating to less than about 600° C., more preferably less than about 500° C.

According to another aspect of the present invention, a process for forming a glass-to-metal seal is provided. The process includes the steps of providing a conductive metal pin, plating the metal pin with a layer of a noble metal (e.g., gold or platinum), placing a glass preform having a bore therethrough within a cavity of an outer metal body, wherein the glass has a softening point of less than about 650° C. and a coefficient of thermal expansion that is at least about $10\times10^{-7}$ per °C. less than the metal body. The pin is inserted into the bore in the glass preform, the components are heated to a temperature in excess of the softening point of the glass and less than about 700° C. and the body is cooled to form a glass-to-metal seal.

According to one embodiment of this process, the plating step includes the step of barrel plating the metal pin with a layer of the noble metal. Barrel plating is a fast and economical method for plating pins. The pin can also be pre-plated (e.g., by barrel plating) with a metal sublayer (e.g., nickel) before the plating step.

According to another aspect of the present invention, a glass-to-metal seal is provided. The glass-to-metal seal generally includes an outer body having a cavity, a conductive pin having a layer of a noble metal (e.g., gold or platinum) coated over substantially all of the outer surface of the conductive pin, and fused glass disposed within the cavity forming a hermetic seal between the pin and outer body, wherein the outer body has a coefficient of thermal expansion that is greater than the glass and the glass has a softening point of less than about 650° C. The noble metal coating over substantially all of the outer surface prevents premature corrosion on every portion of the pin.

According to one embodiment of this aspect of the present invention, the outer body is a metal having a coefficient of thermal expansion that is at least about $10\times10^{-7}$ per °C. greater than the coefficient of thermal expansion of the glass. For example, the outer body can have a coefficient of thermal expansion of from about $120\times10^{-7}$ per °C. to about $200\times10^{-7}$ per °C. and the fused glass can have a coefficient of thermal expansion of from about $80\times10^{-7}$ per °C. to about $110\times10^{-7}$ per °C. Preferably the fused glass has a coefficient of thermal expansion substantially similar to the coefficient of thermal expansion of the conductive pin. The outer body can advantageously be stainless steel. The glass preferably has a softening point of less than about 550° C., more preferably less than about 450° C. The conductive pin can advantageously include a sublayer (e.g., comprising nickel) under the layer of noble metal to improve adhesion of the noble metal to the conductive pin. Such sublayer preferably has a thickness of from about 25 microinches to about 200 microinches. The layer of noble metal can preferably have a thickness of from about 50 microinches to about 300 microinches.

According to yet another aspect of the present invention, a glass-to-metal seal is provided including a metal outer body having a cavity therethrough, a metal pin extending through the cavity and having a layer of gold coated over substantially all of the outer surface of the pin, and fused glass within the cavity and forming a substantially hermetic seal between the pin and the outer body wherein the fused glass has a coefficient of thermal expansion that is at least about $10\times10^{-7}$ per °C. less than the coefficient of thermal expansion of the outer body and has a softening point of less than about 650° C. In a preferred embodiment, the glass has a softening point of less than about 450° C.

DETAILED DESCRIPTION

The present invention is directed to an improved process for forming a glass-to-metal seal between a conductive pin and the cavity of an outer body. The process generally includes the steps of providing a conductive pin having a layer of a noble metal (e.g., gold, platinum, silver, palladium, etc . . . ) coated on an outer surface thereof, placing glass within the cavity of the hollow body, inserting the coated pin into the glass, heating the assembly to a temperature in excess of the softening point of the glass but less than about 700° C., and cooling the assembly below the softening point of the glass.

An important feature of the process is heating to a temperature that is lower than the temperature at which the noble metal substantially diffuses into the underlying conductive pin, thereby allowing the noble metal to be coated onto the conductive pin prior to formation of the glass-to-metal seal by heating the assembly. This feature is particularly advantageous because it avoids the need to coat the conductive pin after fusing of the assembly and thereby avoids expensive and time-consuming processes, such as masking and/or selective plating. In one embodiment of the present invention, the assembly is heated to a temperature of less than about 700° C. to prevent substantial diffusion.

Figure 1:
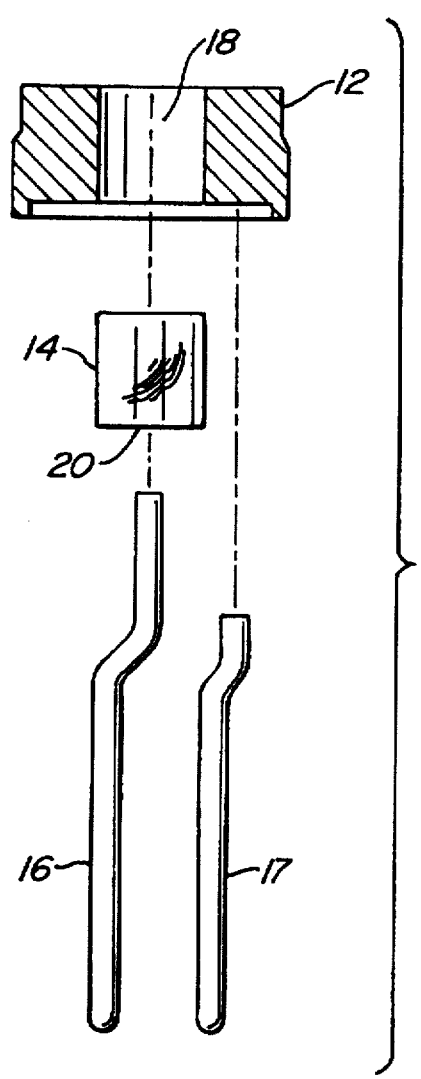
FIG. 1 illustrates an assembly view in partial section of the various components for producing a hermetic feedthrough device according to one embodiment of the present invention.
Figure 2:
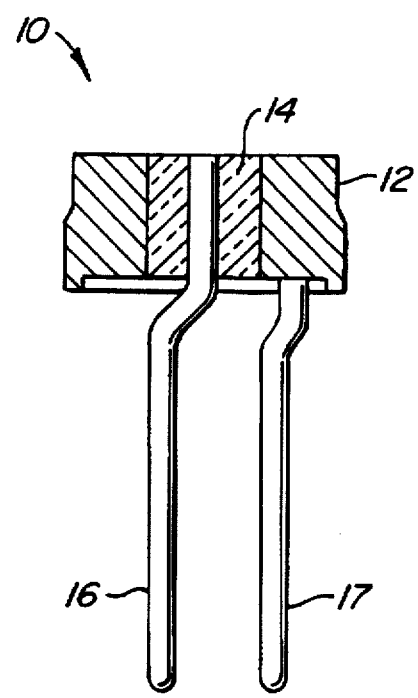
FIG. 2 illustrates a side sectional view of a completed hermetic feedthrough device utilizing the components illustrated in FIG. 1.
Figure 6:
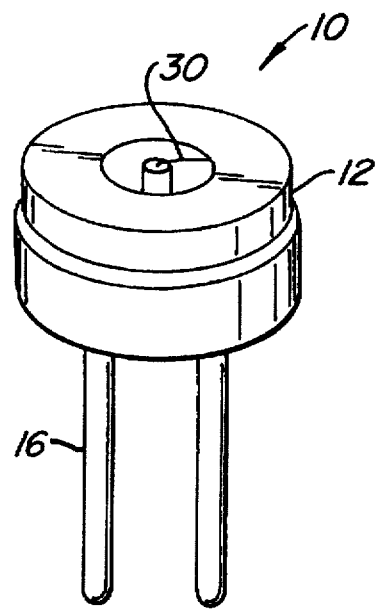
FIG. 6 illustrates a perspective view of a header device produced according to the present invention.

A preferred embodiment of the present invention relates to the production of a hermetic feedthrough, such as a header for an airbag inflator, as illustrated in FIGS. 1, 2 and 6. Referring specifically to FIG. 1, the pre-assembled components of the feedthrough include an eyelet 12, glass tubing 14, a gold-coated conductive pin 16, and a weld pin 17.

According to this embodiment, the outer body is an eyelet 12 and is fabricated from a conductive material, preferably a corrosion resistant metal, such as stainless steel. Stainless steel is resistant to rust and corrosion, which is advantageous when the device should perform after being subjected to a range of conditions (e.g., extreme temperature and humidity) over a long period of time. Further, stainless steel can advantageously create a strong compression seal when used with certain glass compositions, as is discussed hereinbelow. Preferably, the stainless steel is weldable, such as a type 304L stainless steel, which has a CTE of about $178 \times 10^{-7}$ per °C. The outer body can also be fabricated from other metals, such as nickel-plated cold rolled steel, or non-metals, such as polycrystalline ceramics.

Figure 3:
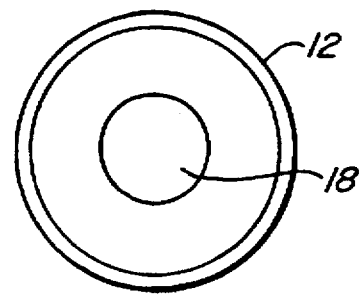
FIG. 3 is an end view of the eyelet illustrated in FIGS. 1 and 2.

As illustrated in FIGS. 1–3, the eyelet 12 of the representative embodiment is cylindrically-shaped and has a cylindrical cavity 18 formed therein. The cavity be extends through the eyelet 12 and is concentric with the center axis of the eyelet 12.

During assembly of the header, the glass tubing 14 is placed within the cavity be of the eyelet. Preferably, the glass tubing 14 is substantially free from large bubbles or pores. More preferably, any bubbles within the glass are less than about 0.015 inches (0.38 mm) in diameter. However, some pores can form during fusing and be present in the final product. It should be appreciated that other forms of glass, such as powdered glass pressed into a preform, can also be utilized in practicing the present invention.

According to one embodiment of the present invention, the glass has a CTE that is lower than the CTE of the outer body (e.g., the eyelet 12) such that a sufficient compression seal will form. The required difference in CTE will vary with part size: the larger the part, the less difference required.

Preferably, the CTE of the glass is at least about $10 \times 10^{-7}$ per °C. lower than the CTE of the outer body, and more preferably at least about $50 \times 10^{-7}$ per °C. lower. In one embodiment, the glass has a CTE of from about $80 \times 10^{-7}$ per °C. to about $110 \times 10^{-7}$ per °C., such as about $89 \times 10^{-7}$ per °C. For example, a glass sold under the designation 7576 by the Corning Corporation, Corning, N.Y., a zinc-boric-lead glass which has a CTE of about $100 \times 10^{-7}$ per °C., is particularly useful. Another particularly useful glass is Corning 1416, a lead-aluminosilicate glass which has a CTE of about $81 \times 10^{-7}$ per °C. In a preferred embodiment, the glass comprises Corning 1417, a lead-aluminosilicate glass which has a CTE of about $89 \times 10^{-7}$ per °C. ("1417 glass").

According to the present invention, the glass tubing 14 has a softening point below the temperature at which the noble metal coating on the conductive pin 16 substantially diffuses into the underlying material. As used herein, the term "softening point" refers to the temperature at which a material has a viscosity of $10^{7.6}$ poise. Significant diffusion of the noble metal coating into the underlying material can adversely affect the corrosion resistance of the coating. For example, in the described embodiment, the gold coating tends to substantially diffuse into a nickel sublayer used for improved adhesion at or above about 700° C. Preferably, the glass is selected to have a softening point that is at least about 50° C. below the temperature at which substantial diffusion occurs. Therefore, the glass tubing 14 in the described embodiment is chosen to have a softening point of about 650° C. or lower. Preferably the softening point is less than about 550° C., and more preferably is less than about 450° C. In the described embodiment, the 1417 glass tubing 14 has a softening point of about 427° C.

As noted, the softening point is preferred to be at least about 50° C. below the temperature at which substantial diffusion occurs since glass-to-metal seals are typically formed at a temperature of at least about 50° C. higher than the softening point. This higher temperature is often referred to as the sealing temperature. For example, in the described embodiment, the 1417 glass tubing 14 has a manufacturer's recommended sealing temperature of about 487° C.

The glass tubing 14 includes a bore 20 adapted to receive the conductive pin 16. In the illustrated embodiment, the center of the bore 20 is aligned with the center of the glass. After the glass tubing 14 is placed in the eyelet, the conductive pin 16 is placed through the bore 20 of the glass tubing.

The conductive pin 16 preferably has a CTE that is substantially similar to that of the glass, e.g., within about $25 \times 10^{-7}$ per °C. or less of the glass. When 1417 glass is used, the pin 16 can preferably be made from a material corresponding to Alloy 52, an iron-nickel alloy (52% Ni and 48% Fe) having a CTE of about $110 \times 10^{-7}$ per °C. The pin could also be fabricated from other metals, such as Kovar (a trademark of Westinghouse Electric Corp., E. Pittsburgh, Pa.), which is also known as Alloy 42 (42% Ni and 58% Fe). It is preferred that the CTE of the glass and pin be within about $25 \times 10^{-7}$ per °C. so that the conductive pin 16 does not place significant additional stress on the glass during heating and cooling.

In a preferred embodiment of the present invention, the pin 16 is plated with a sublayer of nickel before assembly and before gold plating. Applying a sublayer improves the adhesion of the gold coating and inhibits diffusion of the gold into the pin substrate. For example, the pins may be barrel plated with from about 25 microinches to about 200 microinches, preferably about 80 microinches to 100 microinches, of nickel by loading them into a barrel with a suitable electrolyte. Barrel plating is advantageous since large quantities of pins (e.g., up to about 10,000 pins or more in a 5-inch×6-inch barrel) can be plated simultaneously.

In one embodiment of the barrel plating process, the pins are placed into a rotatable screen barrel, preferably along with shot media (e.g., plastic, stainless steel or other suitable material) to prevent pins from sticking. The barrel is immersed into a nickel-sulfamate bath through which an electric current is passed, resulting in plating of the pins with nickel. After plating, the pins 16 are preferably annealed at about 750° C. to 850° C. in a reducing atmosphere (e.g., hydrogen and nitrogen) to relieve stress and densify the plating.

In accordance with the present invention, prior to assembling and fusing the components to form the seal, the conductive pin 16 is coated with a noble metal over at least a portion of the exterior surface thereof. Preferably, the entire outer surface of the pin is coated. In a preferred embodiment, the noble metal is gold. As used herein, the term "gold" or "gold coating" includes gold and gold alloys including at least about 50 weight percent gold. Preferably, the gold coating is 99 weight percent gold or higher. In one embodiment, the gold coating covers substantially the entire surface of the conductive pin 16 and the pins are preferably coated by a bulk coating process, such as a barrel plating process similar to that utilized for the above-described nickel plating operation.

To coat the pins with gold using a barrel plating process, a gold-cyanide bath is typically used. The pins are placed in a rotatable screen barrel along with the shot media to prevent the pins from sticking. The barrel is immersed into a gold cyanide bath through which an electric current is passed and the pins are plated with gold. The gold coating preferably has a thickness in the range of from about 50 to about 300 microinches, more preferably from about 80 to 150 microinches. It should be appreciated that other plating methods could also be utilized.

After assembling the components as generally described above, the glass is fused to create a substantially hermetic seal between the glass and the metal components. As used herein, the term fused refers to the process of heating the glass to a temperature equal to or above the softening point of the glass to allow the glass to viscously flow or creep. The temperature will vary depending on the particular glass composition, but should be less than the temperature at which the noble metal coating will substantially diffuse into the underlying layer. Preferably, the heating temperature is less than about 700° C., more preferably is less than about 600° C., and most preferably is less than about 500° C.

Figure 4:
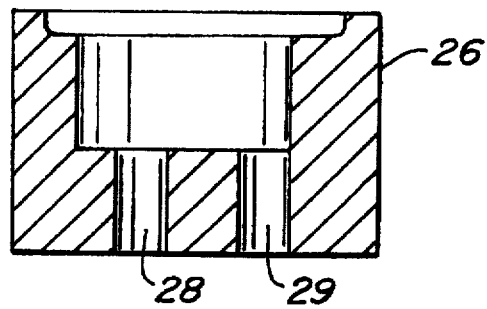
FIG. 4 illustrates the top portion of a fusing fixture useful in practicing the present invention.
Figure 5:
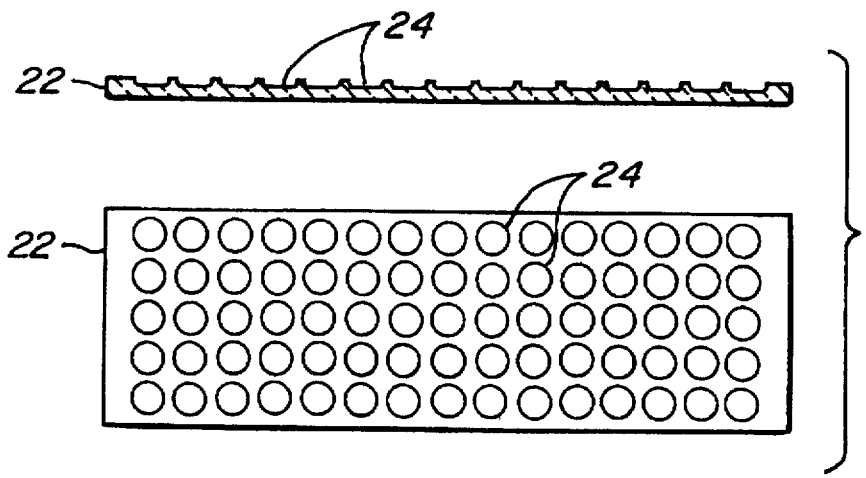
FIG. 5 illustrates the bottom portion of a fusing fixture useful in conjunction with the top portion illustrated in FIG. 4.

In one embodiment of the present invention, the fusing operation is assisted by the use of a fixture for maintaining the parts of the assembly substantially in alignment. Referring to FIGS. 4 and 5, the fixture includes a lower portion 22 having a plurality of depressions 24 adapted to receive and secure the eyelet, such that the upper surface of the eyelet 12 (FIG. 1) engages the lower surface of the depression and rests therein. Thereafter, individual fixture caps 26 are placed over the assemblies to secure the ends of the pins and keep the pins from moving significantly during fusing. The fixture caps 26 preferably include a hole 28 that is adapted to fit over the end of the conductive pin 16 and another hole 29 that is adapted to fit over the end of the weld pin 17 (FIG. 1) when the fixture cap is placed over the lower portion 22 of the fixture. This configuration advantageously provides a means for keeping the conductive pin 16 (FIG. 1) substantially aligned and stationary during the fusing process.

The fixture components are preferably fabricated from metal, such as stainless steel or brass. Graphite can also be used, but is not preferred in the described embodiment due to compatibility problems between lead-containing glass and graphite.

The fixture, which preferably holds a plurality of the eyelet 12 assemblies, is placed in a furnace. When 1417 glass tubing 14 is used, the glass tube is preferably fused by heating to a temperature of from about the softening point (427° C.) to about 700° C., and more preferably from about 440° C. to about 480° C. The heating temperature may vary according to the composition of the glass. Preferably, an oxygen-containing atmosphere (e.g. air) is used during fusion of the 1417 glass. Such an atmosphere advantageously prevents lead-oxide contained in the glass from reducing to lead, which can adversely affect the properties of the device due to its conductivity. When a non-lead glass is utilized, reducing atmospheres can be advantageous since this will minimize oxide formation on the metal components.

The complete cycle of heating the fixture containing the eyelet assemblies and cooling the fixture back to room temperature can occur fairly rapidly. In one embodiment according to the present invention, the complete cycle takes about 50 minutes or less. For example, during one exemplary heating cycle, the assembly can be heated from ambient temperature to about 460° C. at a rate of about 25° C./minute. The assembly can then be held at 460° C. for about 20 minutes and subsequently cooled to 300° C. at a rate of about 10° C./minute. The assembly can then be furnace cooled to ambient temperature. After the fixture has cooled, the fixture caps 26 are removed and the fused assemblies are removed from the lower portion 22 of the fixture.

The fusing and cooling process of the described embodiment creates a substantially hermetic seal between the eyelet 12 and the glass 14. Since the thermal expansion of the glass is lower than the thermal expansion of the outer body, a hermetic compression seal is formed within the device. This advantageously creates a strong seal between the glass and the metal components. As used herein, a hermetic seal is one which allows less than about $10^{-6}$ cc/sec of helium to penetrate during a helium leak test according to Military Standard 883, method 1014.9.

When the device is used as an air bag header or similar device, the strength of the conductive pin 16 within the glass 14 (the "pull strength") is also important. A high pull strength results in a lower probability that a propellant explosion will inadvertently propel the pin 16 out of the device, resulting in decreased pressure of gas in the air bag. Better pull strength also allows the explosive material to be compacted at a higher pressure against the header assembly. Preferably, the pull strength of the conductive pin exceeds about 40 pounds of force.

When the device is a header or a similar device, a ground pin 17 can advantageously be attached to the device to function as an electrical ground. Preferably, the ground pin 17 is resistance welded onto the metal eyelet. Resistance welding creates less splatter, creates a stronger weld joint and a more consistent weld than, for example, arc percussive welding. The ground pin can be fabricated from a number of metals, including stainless steel, such as type 304L. After welding, the eyelet 12 is preferably inspected to ensure that the weld is sufficiently strong. An axial strength of at least about 40 pounds force is preferred.

FIG. 2 illustrates a cross section of a hermetic coaxial feedthrough according to an embodiment of the present invention. The glass 14 is fused to the eyelet 12 to create a substantially hermetic seal. In one embodiment of the invention, the top surface of the assembly is machined to reduce the roughness of the top surface.

As a result of the foregoing process, the gold coating covers substantially the entire exposed surface of the conductive pin 16 without contacting the eyelet 12. Further, the process allows the gold to be coated prior to assembly and fusing of the device, thereby permitting the use of a low-cost plating process, rather than an expensive masking and/or selective plating process. It is believed that the plating costs for the conductive pin may be reduced by about 80% by virtue of the present invention.

Devices according to the present invention can be utilized in a number of applications, including applications wherein a low-cost, reliable, corrosion-resistant coating is required. For example, the process can be used to make air-bag headers, electronic packages, connectors, relay header bases, and electrical housings. The hermeticity of the glass to metal seal makes the device and process particularly applicable to hermetic applications, such as in microwave packages.

Referring to FIG. 6, when the device is an air bag header or similar device, a bridge wire 30 can be applied between the pin 16 and the eyelet 12 after the device has been sufficiently machined. The bridge wire 30 can advantageously be applied by a wirebonding process and traverses the fused glass surface to connect the end of the conductive pin 16 to the eyelet 12 surface. Typically, the bridge wire 30 has a diameter of from about 0.0008 to about 0.0013 inches (0.020 to 0.033 mm).

According to another aspect of the present invention, the conductive pin 16 is coated with a sublayer of cobalt prior to application of the noble metal coating. When utilizing gold as the noble metal coating, it has been found that diffusion of the gold into the cobalt sublayer commences at a relatively high temperature compared to the temperature at which gold diffuses into nickel. For example, substantial diffusion of gold into cobalt occurs at or above about 1000° C., while substantial diffusion of gold into nickel occurs at or above about 700° C. In a preferred embodiment, the conductive pin comprises a base material of tungsten or molybdenum followed by a sublayer of nickel. The cobalt coating is subsequently applied, followed by the noble metal coating. Due to the high temperature at which diffusion occurs in the present embodiment, the noble metal layer can be applied prior to assembly and fusion of the hermetic seal. The only limitation on such a process would be the utilization of a glass having a softening point of less than about 950° C. in order to avoid diffusion of the noble metal into the underlying cobalt layer.

EXAMPLE

A stainless steel eyelet (type 304L stainless steel) with a CTE of about $178 \times 10^{-7}$ per °C. is provided having an outer diameter of about 0.288 inch and a cavity having a diameter of about 0.120 inch.

Glass tubing having an outer diameter of about 0.116 inch and an inner bore having a diameter of about 0.042 inch is placed within the cavity of the eyelet. The glass tubing has a length of about 0.138 inch. The glass is a lead-aluminosilicate glass (Corning 1417 from Corning, Inc., Corning, N.Y.) that is substantially free of foreign material and bubbles. The glass has a softening point of 427° C., a recommended sealing temperature of 487° C. and a CTE of about $89 \times 10^{-7}$ per °C.

Conductive pins having a diameter of about 0.040 inch are also provided. The conductive pins are fabricated from Alloy 52 (52% Ni and 48% Fe). The conductive pins are placed into a barrel plating apparatus. About 10,000 pins are placed into a rotatable screen barrel along with about 100 ml of 8 mm shot media. The barrel is immersed into a nickel-sulfamate bath having a nickel-sulfamate concentration that yields a nickel concentration of about 10.2 oz/gal (76.5 g/l). The bath also includes water, boric acid and other additives such as an anti-pit agent and an anti-corrosion additive. An electric current of about 10 amps is passed through the bath while the pins are rotated in the screen barrel. The current and barrel rotation are maintained for about 92 minutes, at which time the barrel is removed from the plating bath and the pins are removed from the barrel. The pins are than placed into an annealing furnace and are heated to a temperature of about 800° C. in an atmosphere comprising about 25% hydrogen and about 75% nitrogen.

After the nickel coating has been annealed, the pins are then placed into a similar barrel plating apparatus. The plating solution is now a gold cyanide bath having a gold concentration of about 0.9 troy oz/gal. An electric current of about 8 amps is applied and the electric current and barrel rotation are maintained for about 20 minutes, after which time the pins are removed.

The conductive pin is now completely plated with a 100 microinch gold coating over an 80 microinch nickel sublayer and the pin has a CTE of about $100 \times 10^{-7}$ per °C. The conductive pin is then placed within the inner bore of the glass tubing which has been placed in the eyelet cavity.

This assembly is placed in a brass fixture and placed in a furnace at substantially ambient temperature. The fixture engages the pins and prevents the conductive pin from substantially shifting during fusing. The furnace is heated at a rate of about 25° C./min to about 460° C. under air. The assembly is held at 460° C. for about 20 minutes and then cooled at a rate of about 10° C./min to about 300° C. The assembly is then furnace cooled to ambient temperature.

The fused assemblies are removed from the fixture and taken to a machining operation. The upper surface of the eyelet is machined to reduce the surface roughness.

The center conductive pin has a pull strength of greater than about 40 pounds and the device is substantially hermetic. The device can then have a bridge wire plated or welded across the top surface for use as a header and/or a ground pin welded to the eyelet. The welding of a ground pin to the eyelet can also occur before fusing the assembly, if desired.

While various embodiments of the present invention have been described in detail, it is apparent that modifications and adaptations of these embodiments will occur to those skilled in the art. However, it is to be expressly understood that such modifications and adaptations are within the spirit and scope of the present invention.

What is claimed is:

1. A process for forming a glass-to-metal seal, said process comprising the steps of:
   (a) providing a conductive pin having an outer surface, said pin having a layer of a noble metal coated on at least a portion of said outer surface;
   (b) placing glass within a cavity of an outer body, said glass having a softening point of less than about 650° C.;
   (c) inserting said coated pin into said glass;
   (d) heating said body, said coated pin and said glass to a temperature of at least equal to the softening point of said glass and less than about 700° C.; and (e) cooling said outer body, said coated pin and said glass to solidify said glass and form a glass-to-metal seal.

2. A process as recited in claim 1, wherein said noble metal is selected from the group consisting of gold and platinum.

3. A process as recited in claim 1, wherein said noble metal is gold.

4. A process as recited in claim 1, wherein said outer body has a coefficient of thermal expansion that is greater than the coefficient of thermal expansion of said glass.

5. A process as recited in claim 4, wherein the coefficient of thermal expansion of said outer body is at least about $10 \times 10^{-7}$ per °C. greater than the coefficient of thermal expansion of said glass.

6. A process as recited in claim 4, wherein said outer body has a coefficient of thermal expansion of from about $120 \times 10^{-7}$ per °C. to about $200 \times 10^{-7}$ per °C. and said glass has a coefficient of thermal expansion of from about $80 \times 10^{-7}$ per °C. to about $110 \times 10^{-7}$ per °C.

7. A process as recited in claim 1, wherein said glass has a coefficient of thermal expansion substantially similar to the coefficient of thermal expansion of said conductive pin.

8. A process as recited in claim 7, wherein said glass has a coefficient of thermal expansion of from about $80 \times 10^{-7}$ per °C. to about $110 \times 10^{-7}$ per °C. and said conductive pin has a coefficient of thermal expansion of from about $90 \times 10^{-7}$ per °C. to about $115 \times 10^{-7}$ per °C.

9. A process as recited in claim 1, wherein said outer body comprises stainless steel.

10. A process as recited in claim 1, wherein said conductive pin has a layer of noble metal coated over substantially all of said outer surface.

11. A process as recited in claim 1, wherein said conductive pin is an iron-nickel alloy having a layer of noble metal coated thereon.

12. A process as recited in claim 1, wherein said coated pin comprises a sublayer of nickel under a layer of gold.

13. A process as recited in claim 12, wherein said sublayer of nickel has a thickness of from about 25 microinches to about 200 microinches.

14. A process as recited in claim 1, wherein said layer of noble metal has a thickness of from about 50 microinches to about 300 microinches.

15. A process as recited in claim 14, wherein said layer of noble metal has a thickness of from about 80 microinches to about 150 microinches.

16. A process as recited in claim 1, wherein said glass comprises a glass preform having a bore therethrough for insertably receiving said coated pin.

17. A process as recited in claim 1, wherein said heating step comprises heating to a temperature of less than about 600° C.

18. A process as recited in claim 1, wherein said heating step comprises heating to a temperature of less than about 500° C.

19. A process as recited in claim 1, wherein said providing step comprises the step of barrel plating said conductive pin to obtain said layer of noble metal.

20. A process for forming a glass-to-metal seal, said process comprising the steps of:

(a) providing a metal pin having an outer surface;

(b) plating said metal pin with a layer of gold on said outer surface;

(c) placing a glass preform having a bore therethrough within a cavity of an outer metal body, said glass preform having a softening point of less than about 650° C. and a coefficient of thermal expansion that is at least about $10 \times 10^{-7}$ per °C. less than said outer metal body;

(d) inserting said plated pin into said bore in said glass preform;

(e) heating said metal body, said plated pin and said glass preform to a temperature of least equal to the softening point of said glass preform and less than about 700° C.; and (f) cooling said body, said plated pin and said glass preform to solidify said glass and form a glass-to-metal seal.

21. A process as recited in claim 20, wherein said plating step comprises barrel plating said metal pin with a layer of gold.

22. A process as recited in claim 20, further comprising the step of pre-plating said metal pin with a metal sublayer before said plating step.

23. A process as recited in claim 22, wherein said sublayer is a nickel sublayer.

24. A process as recited in claim 20, wherein said heating step comprises heating to a temperature of less than about 600° C.

25. A process as recited in claim 20, wherein said heating step comprises heating to a temperature of less than about 500° C.

26. A process for forming a glass-to-metal seal, said process comprising the steps of:

(a) providing a metal pin having an outer surface;

(b) plating said outer surface of said pin with a layer of nickel;

(c) thereafter plating said outer surface of said metal pin with a layer of gold;

(d) placing a glass preform having a bore therethrough within a cavity of an outer metal body, said glass preform having a softening point of less than about 450° C. and a coefficient of thermal expansion that is at least about $10 \times 10^{-7}$ per °C. less than said outer metal body;

(e) inserting said plated pin into said bore in said glass preform;

(f) heating said metal body, said plated pin and said glass preform to a temperature of at least equal to the softening point of said glass preform and less than about 500° C.; and (g) cooling said body, said plated pin and said glass preform to solidify said glass and form a glass-to-metal seal.

* * * * *